Figure 1:
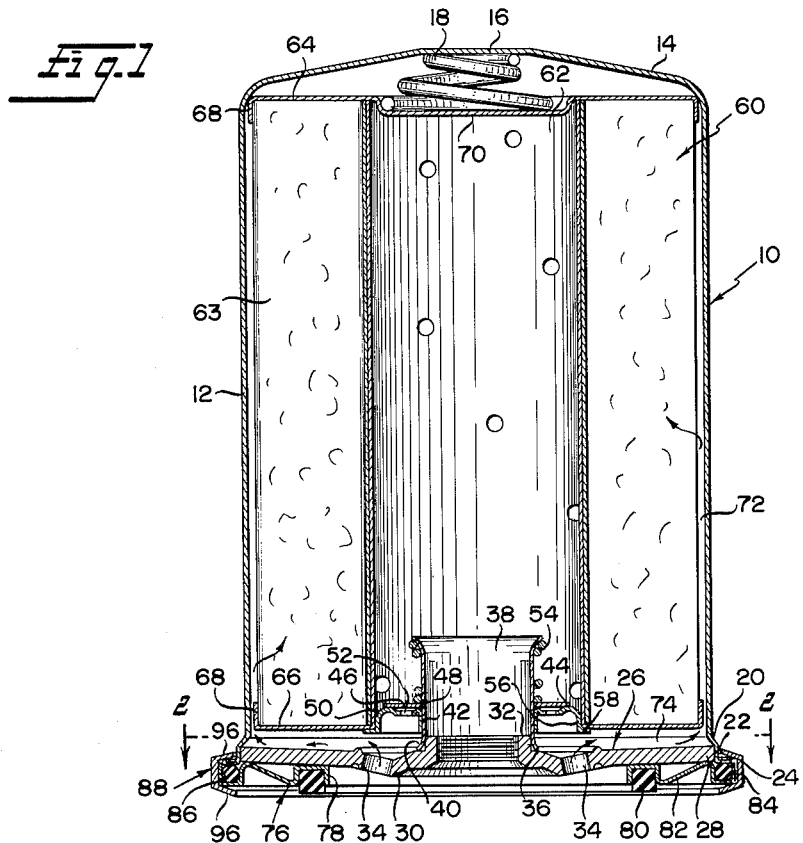

July 12, 1966 W. H. HULTGREN 3,260,367

OIL FILTER WITH REMOVABLE HOUSING

Filed Dec. 5, 1963

INVENTOR
William Herbert Hultgren

BY Winter, Ray, Adams & Jackman

ATTORNEYS 3,260,367
OIL FILTER WITH REMOVABLE HOUSING
William Herbert Hultgren, Mount Carmel, Ill., assignor to Champion Laboratories, Inc., West Salem, Ill., a corporation of Connecticut
Filed Dec. 5, 1963, Ser. No. 328,303
11 Claims. (Cl. 210—130)

The present invention relates to an oil filter, and more particularly relates to an oil filter known as a spin-on or screw-on type filter.

A spin-on or screw-on type oil filter is adapted to be mounted on the engine block of an internal combustion engine, although it is not to be limited to this particular use since it is apparent that it can be used in many other systems if desired. However, for purposes of illustration only, the oil filter of the present invention will be described in connection with its use for an internal combustion engine.

In a spin-on type oil filter, the filter element or filter cartridge which generally consists of an annular convoluted filter element made of pleated paper impregnated with phenolic resin is generally sealed within a metal housing or casing. The casing is provided with a bottom member having a threaded nipple member for screwing onto an adapter bushing secured to the engine block of an internal combustion engine. Resilient sealing means are provided in the bottom member for bearing against an adapter member secured to the engine block so that the filter is sealed with respect to the engine and no oil can leak therebetween. This type of filter can be used as a full-flow or partial-flow filter and when the filter element permanently sealed within the housing becomes contaminated or clogged with dirt so that it is no longer serviceable, the entire unit is unscrewed from the engine block and thrown away or discarded and a completely new filter is again replaced on the engine block. This type of filter is generally provided with a bypass valve so that should the filter element permanently sealed therein become clogged, the engine will not be starved of oil since the bypass valve will open and oil will continue to flow through the inlet and outlet of the filter even though it is not being filtered by the filter element. This type of filter is sometimes provided with an anti-drainback valve which is important where the oil filter operates in an upright position so that the oil will not drain back to the crankcase but will remain in the filter housing to supply the engine with oil upon initial starting of the engine. In this type of oil filter all of the parts except the filter cartridge are generally made of metal material and, hence, have a serviceable or operational life which greatly exceeds that of the paper filter element.

In accordance with the present invention, an oil filter is provided of the screw-on or spin-on type in which only the oil-filter cartridge is removed and discarded upon becoming clogged with contaminants, and the remaining portions of the oil filter can be used again with a fresh oil filter cartridge.

It is an object of the present invention to provide a spin-on type oil filter for mounting on the engine block of an internal combustion engine which can be used as a full-flow or partial-flow filter, and in which the filter housing can readily be removed to replace the paper filter cartridge therein so that the housing can be used indefinitely.

It is another object of the present invention to provide what is known as a screw-in, throw-away type oil filter, which can be provided with valve means therein and which can be screwed into the adapter bushing of an engine block, and which has clamping means associated with the filter housing and bottom member so that an oil filter cartridge can be sealed therein for filtering oil passed through the housing at one time, and which clamping means can be removed from the housing and bottom member at another time so as to change the oil filter cartridge therein when it becomes clogged with dirt and contaminants.

It is another object of the present invention to provide a spin-on, screw-in, throw-away type of oil filter that can be mounted on the engine block of an internal combustion engine for filtering oil passed therethrough, and which bottom member need not be disconnected or unscrewed from the engine block when it is desired to replace the paper filter oil cartridge in the filter housing.

It is another object of the present invention to provide a spin-on type oil filter provided with a cylindrical housing and a bottom member and clamping means for detachably connecting the housing and bottom member to each other in a fluid-tight relationship to seal an oil filter cartridge therein and in which clamping means can be readily removed from the housing and bottom member so that the oil filter cartridge sealed therein is substantially completely exposed for replacement with a fresh oil filter cartridge.

It is another object of the present invention to provide a spin-on type oil filter with a cylindrical metal housing and a bottom member, with clamping means disposed adjacent the bottom member and the cylindrical housing, which clamping means are detachably connected thereto so that upon removal of the clamping means the housing can be completely withdrawn from the oil filter cartridge sealed therein and the entire circumferential area of the entire cartridge is exposed and can readily be grasped manually so that a fresh oil filter cartridge can be mounted on the bottom member.

It is another object of the present invention to provide a spin-on type oil filter than can readily be mounted on the engine block of an internal combustion engine and replace the so-called throw-away oil filters now in use and which oil filter of the present invention has the advantage that it is no longer necessary to throw away the bottom member, the oil filter housing, and the valves therein, as in a conventional throw-away type filter.

Figure 2:
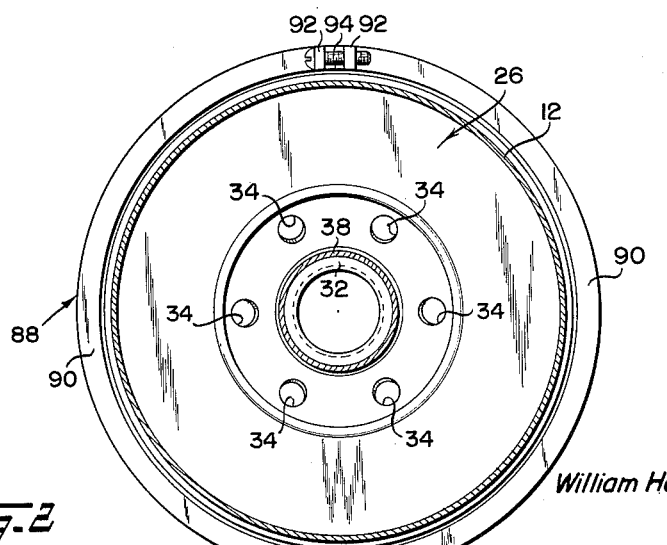

Various other objects and advantages of the present invention will be readily apparent from the following detailed description when considered in connection with the accompanying drawings forming a part thereof, and in which FIGURE 1 is a vertical section through the oil filter of the present invention; and FIGURE 2 is a section taken along the line 2—2 of FIGURE 1.

Referring to the drawings, the reference numeral 10 generally designates an oil filter, or oil filter unit, provided with a thin-walled cylindrical metal casing or housing 12. The upper end of the housing 12 is provided with a closed dome-shaped end 14 having a central flat horizontal portion 16, to the inner side of which is secured a biasing coil spring 18 by soldering or other similar means. The lower end of the housing or casing 12 is open and is flared outwardly at 20 and thereafter has a vertical downwardly extending rim 22 which terminates in a substantially horizontal rolled seam 24 bent back upon itself as is best seen in FIGURE 1. The rolled seam 24 extends outwardly beyond the vertical rim 22 and beyond the periphery of the cylindrical portion of the housing.

The oil filter is provided with a bottom member generally designated as 26. The bottom member is made of metal and is substantially thicker than the cylindrical casing 12 and is of circular configuration. The bottom member 26 has its peripheral portion 28 of sufficient size so that the vertical rim 22 of the housing 12 bears against its circumference. Peripheral portion 28 is inclined slightly downwardly and inwardly toward its center, and adjacent its central portion 30 is inclined downwardly at a steeper angle and thereafter extends vertically upwardly to provide a bushing or nipple 32 disposed centrally thereof. Nipple 32 is internally threaded and is adapted to be screwed onto an adapter bushing or member, not shown, secured to the engine block. The portion 30 is provided with a plurality of circumferentially spaced oil inlet openings or ports 34 through which oil from the engine flows. A horizontal shoulder 36 is provided on the bottom member around the nipple 32 for mounting a short sleeve 38 thereon. Sleeve 38 is secured to the nipple 32 by soldering or similar means to provide an oil-tight seal around its lower end 40.

Another sleeve 42 which is substantially shorter than sleeve 38 is mounted around the inner sleeve 38 and secured thereto by any well-known means in an oil-tight relationship. The sleeve 42 is provided with a laterally extending portion 44 forming an annular ring around the inner sleeve 38. The portion 44 is provided with a plurality of circumferentially spaced bypass oil ports or openings 46. The lateral portion 44 is also provided with inner and outer ribs 48 and 50, respectively, for seating an annular or ring-type disc valve 52 thereon. Valve 52 is the bypass valve of the oil filter and a spring member 54 mounted around the inner sleeve 38 normally biases or urges the valve 52 into a seated or closed position to close off the bypass oil ports 46. The spring 54 is secured to the inner sleeve 38 by flaring the upper edge of the inner sleeve 38 in an outward direction. The extreme outer end of the lateral portion 44 extends downwardly, as indicated at 56, and terminates in a substantially horizontally extending rim 58. The rim 58 forms a seat for the oil filter cartridge 60.

The oil filter cartridge 60 is an annulus of pleated paper impregnated with phenolic resin with the convolutions or pleats extending in a radial direction around a perforated center tube 62. The opposite ends or edges of the pleats 63 are sealed off by end caps 64 and 66, respectively, having turned in rims 68 extending in a direction toward the center of the pleats. The upper end cap 64 is provided with a recessed central portion 70 projecting into the center tube 62 and completely sealing off the center tube as well as the pleats. The coil spring 18 is adapted to seat in the central portion 70 to hold or seat the oil filter cartridge 60 and particularly the lower end cap 66 in an oil-tight relationship on the rim 58. The diameter of the oil cartridge 60 is less than the diameter of the inner surface of the housing 12 so as to provide an annular flow channel 72 around the circumferential portion of the oil filter cartridge. It will also be noted that the rim 58 is disposed in spaced relationship above the top or inner surface of the bottom member 26 to provide a laterally extending flow channel 74 between the bottom of the oil filter cartridge and the bottom member so that oil passing through the inlet ports 34 flows through the lateral channel 74 and upwardly into the annular chamber 72 and thereafter in an outside-in direction through the pleated filter cartridge. The oil then flows into the center tube 62 and out of the filter housing through the inner sleeve 38 and the nipple 32 back into the engine, not shown.

A retainer plate 76 is secured to the outer surface of the bottom member 26. The retainer plate 76 is an annular configuration and is secured to the bottom member 26 by tack welding, soldering, or any similar means. Retainer plate 76 is disposed adjacent the peripheral portion 28 and is provided with a continuous groove or recess 78 adjacent its inner periphery for receiving therein a resilient ring gasket member 80 which bears against the engine block or the engine block adapter member when the oil filter is crewed thereon. It will be noted that the resilient gasket member is substantially square in cross section and the recess or groove 78 in which it is disposed is of substantially the same configuration so that the gasket member 80 can be press-fitted therein and a substantial portion of the gasket member 80 can extend below or project outwardly of the recess. The gasket member 80 and the recess 78 are disposed so as to be positioned in a direction laterally outwardly of the oil inlet ports 34. The gasket member 80 prevents any oil leakage between the oil filter and the engine block. The retainer plate 76 extends diagonally upwardly at 82 from the outer leg of the recess 78 and is provided with a continuous recess or groove 84 adjacent its outer periphery. The groove 84 faces in a direction toward the bottom member 26 and opposite to the direction that the groove 78 faces. The groove 84 is adapted to receive a resilient O-ring sealing member 86 therein. The groove 84 is disposed laterally outwardly of the periphery of the bottom member 26, as best seen in FIGURE 1, and in vertical alignment with the rolled seam or lip 24 so that the rolled lip bears against the O-ring member 86, and provides an oil-tight seal between the housing 12 and the bottom member 26.

A clamping member 88 is provided for detachably connecting the bottom member and retainer plate 76 to the housing 12 so that the oil filter cartridge is sealed therein when the filter is in operation. The clamp member 88 consists of two identical half rings 90 which together form a split ring. Adjacent edges of the half rings 90 are provided with upstanding lugs or ears 92 internally threaded to receive screw members 94 therethrough. The inwardly extending legs 96 of the half rings 90 have their outer ends spaced closer together than their inner ends so that as the screws 94 are threaded home in the ears 92 the clamping member 88 will compress the O-ring sealing member 86 and force the rolled lip 24 thereagainst to provide a very tight seal.

When the spin-on or screw-on type filter of the present invention is mounted on an engine block, the gasket member 80 forms an oil-tight seal between the filter and the engine, while the clamping member 88 is spaced from the engine or the adapter member on which the gasket 80 seats. The nipple 32 at this time is threaded onto an adapter bushing secured in the engine block. The oil from the engine flows through the inlet ports 34 and chambers 74 and 72 and through the pleated paper oil filter cartridge, being discharged into the perforated center tube 62. Any contaminants and dirt carried in the oil are deposited on the upstream side of the pleats and the clean oil is discharged into the center tube 62. The clean oil then passes through the inner sleeve 38 and the nipple 32 and is passed back through the engine.

If, for any reason, the oil filter cartridge becomes clogged with contaminants, the oil passing through the inlet ports 34 will short-circuit the oil filter and flow directly through the bypass ports 46, lifting the valve disc 52 and passing around the outer edge of this valve disc into the center tube and through the inner sleeve 38 back into the engine.

Once the oil filter has been properly secured to the engine block, it is not necessary to remove the bottom member 26 therefrom in order to replace the oil filter cartridge 63 with a fresh cartridge. It can be readily replaced by merely unscrewing the screw members 94 and removing the half ring members 90, after which the housing 12 is lifted off the O-ring member 84 and the bottom member 26. At this time, the entire oil filter cartridge 63 is completely exposed and it is only necessary to grasp the cartridge and remove it from its seated position on the rim 58. It will be noted that the annular channel 72 is very narrow so that the complete removal of the housing from the bottom member and from the oil filter cartridge enables the operator to grasp the oil filter cartridge. This is not so in a structure if the housing 12 were formed integral with the bottom member 26 or secured thereto and there is a removable cover or means to have access to the oil filter through the cover 14.

Another important advantage of the present invention is the fact that the bottom member 26 is completely exposed and can be wiped off if desired and the inner parts, including the inner sleeve 38 and the valve structure, are also exposed so that if necessary any of these parts could be readily replaced without requiring a completely new filter structure should any of the parts be damaged.

Thus, the present invention provides a spin-on or screw-on type oil filter in which the oil filter cartridge can be sealed therein in use and readily removed by utilizing clamping member which detachably connects the bottom member and the housing together adjacent the bottom member.

The present invention provides a spin-on type oil filter in which the filter element which consists of paper material can be readily disposed of when it becomes clogged without discarding the entire unit and the other parts which have a longer serviceable life than the pleated filter element, thereby reducing the cost of material and labor that goes into the many individual parts comprising the filter, which heretofore have been discarded along with the filter element before they have attained their useful service life for which they were designed.

Inasmuch as various changes may be made in the form, location and relative arrangement of the several parts without departing from the essential characteristics of the invention, is will be understood that the invention is not to be limited except by the scope of the appended claims.

What is claimed is:

1. A spin-on type filter for screwing onto an engine block or filter base mounted on the engine block comprising a cylindrical housing closed at its end opposite said engine block, a separate circular bottom member adapted to fit in said open end to close off the housing, threaded means on said bottom member for threading it onto an engine block, inlet and outlet port means in said bottom member for passing oil to be filtered through the housing, resilient sealing means disposed on the outside of said bottom member to form a liquid-tight seal when said bottom member is secured to the engine block, annular means formed integral with said housing and disposed adjacent the edge of said open end and extending outwardly of said housing, annular resilient sealing means carried by said bottom member, said annular resilient sealing means being disposed in vertical alignment with said integral annular means and positioned beyond the circumference of said bottom member and being of a diameter substantially the same as said integral annular means to form a liquid-tight seal therewith, and clamping means for compresssing said integral annular means and annular resilient sealing means together to secure said bottom member to said housing.

2. The filter of claim 1 wherein said resilient sealing and annular resilient sealing means are disposed circumferentially outwardly of said inlet and outlet port means, and oil filter cartridge support means are provided on said bottom member adjacent the open end of said housing.

3. The filter of claim 1 wherein said integral annular means consists of a rolled lip formed integral with and on the edge of said open end of the housing, and the clamping means is a clamp member gripping said lip and said annular resilient sealing means therebetween.

4. The filter of claim 1 wherein said bottom member is provided with a retainer plate secured to its outer side with two circumferential recesses therein and said resilient sealing and annular resilient sealing means are press-fitted into said recesses.

5. The filter of claim 4 wherein said recess for said resilient sealing means faces away from said bottom member and the recess for said annular resilient sealing means faces in the opposite direction toward said housing.

6. A spin-on type filter comprising a thin cylindrical housing having an open end, a thicker circular bottom member adapted to fit into the lower open end of said housing, said housing having a vertical rim disposed to contact the circumferential periphery of said bottom member, circumferentially spaced oil inlet port means in said bottom member adjacent its central portion, a threaded nipple disposed centrally of said bottom member providing an oil outlet opening for screwing said filter onto an engine block, said nipple extending upwardly into said housing, an annular retainer plate secured to the outer side of said bottom member, said retainer plate being disposed laterally outwardly of said inlet port means, said retainer plate having an inner circumferential recess facing away from said bottom plate and an outer circumferential recess facing toward said housing, a first sealing member disposed in said inner recess and a second sealing member disposed in said outer recess, said outer recess and sealing member being disposed radially outwardly of said bottom member periphery, a rolled horizontal seam connected to said vertical rim and seated on said second sealing member, means on said bottom member for supporting an oil filter cartridge therein between said inlet port means and outlet opening, and means for detachably securing said seam and second sealing member in an oil-tight relationship, so said housing can be completely lifted off said bottom member to replace an oil filter cartridge in said housing.

7. The filter of claim 6 wherein said oil filter cartridge support means comprises an inner sleeve secured over said nipple, and an outer sleeve having an annular rim thereon.

8. The filter of claim 7 wherein said outer sleeve has an annular horizontal portion with a plurality of bypass oil ports and an annular disc valve disposed on said annular portion and biasing means normally maintaining said valve closed.

9. The filter of claim 8 wherein said housing has an outwardly flare section joined to the top of said vertical rim and extending inwardly of the bottom member periphery to position it in said housing.

10. The filter of claim 9 wherein said rolled seam is a reverse bent lip.

11. The filter of claim 10 wherein the detachable securing means is a split ring having diverging legs for gripping said lip and second sealing member therebetween.

References Cited by the Examiner

UNITED STATES PATENTS

| | | | |
|---|---|---|---|
| 2,639,783 | 5/1953 | Kovacs | 210—130 X |
| 2,833,415 | 5/1958 | Wilkinson | 210—130 |
| 2,929,506 | 3/1960 | Belgarde | 210—130 X |
| 2,995,250 | 8/1961 | Boewe et al. | 210—130 |
| 3,036,711 | 5/1962 | Wilhelm | 210—130 |
| 3,067,880 | 12/1962 | Bowers et al. | |
| 3,127,255 | 3/1964 | Winslow | 210—130 X |
| 3,132,097 | 5/1964 | Tietz | 210—130 |

SAMIH N. ZAHARNA, *Primary Examiner.*

HARRY B. THORNTON, *Examiner.*

F. A. SPEAR, JR., R. A. CATALPA, *Assistant Examiners.*